(12) United States Patent
Pompen et al.

(10) Patent No.: US 11,518,616 B2
(45) Date of Patent: Dec. 6, 2022

(54) SYSTEM FOR COLLECTION OF PRODUCTS

(71) Applicant: ASDA Stores Limited, Leeds (GB)

(72) Inventors: Peter Pompen, Leeds (GB); Henk Niemansverdriet, Leeds (GB)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 17/136,123

(22) Filed: Dec. 29, 2020

(65) Prior Publication Data

US 2021/0114812 A1 Apr. 22, 2021

Related U.S. Application Data

(63) Continuation of application No. 15/572,100, filed as application No. PCT/GB2016/051293 on May 6, 2016, now Pat. No. 10,899,543.

(30) Foreign Application Priority Data

Aug. 5, 2015 (GB) ..................................... 1507905

(51) Int. Cl.
| | | |
|---|---|---|
| *B65G 1/137* | (2006.01) | |
| *G06Q 10/08* | (2012.01) | |
| *A47F 10/02* | (2006.01) | |

(52) U.S. Cl.
CPC ............ *B65G 1/1378* (2013.01); *A47F 10/02* (2013.01); *G06Q 10/0836* (2013.01)

(58) Field of Classification Search
CPC .... A47F 10/02; B65G 1/1378; G06Q 10/0836
See application file for complete search history.

(56) References Cited

U.S. PATENT DOCUMENTS

| | | | |
|---|---|---|---|
| 3,672,469 | A | 6/1972 | Potrafke |
| 4,149,341 | A | 4/1979 | Ackerson |
| 5,186,281 | A | 2/1993 | Jenkins |
| 5,269,597 | A | 12/1993 | Yenglin et al. |
| 5,836,662 | A | 11/1998 | Robey |
| 9,026,243 | B2 | 5/2015 | Radwallner et al. |
| 9,220,356 | B2 | 12/2015 | Hognaland |
| 9,242,810 | B2 * | 1/2016 | Lõssov ................ B65G 1/137 |

(Continued)

FOREIGN PATENT DOCUMENTS

| | | |
|---|---|---|
| EP | 1696395 A1 | 8/2006 |
| EP | 1986168 A2 | 10/2008 |

(Continued)

OTHER PUBLICATIONS

Office Action in Canadian Patent Application No. 2,982,053, dated Mar. 6, 2019; 4 pages.

(Continued)

*Primary Examiner* — James Keenan

(57) ABSTRACT

According to a first aspect of the invention, there is provided a system for collection of products, the system comprising: at least one carrier (8) for carrying products (40); a collection point (14), at which collection point a user (10) of the system can remove products from the carrier; and a transporter arrangement (16, 20) for transporting the carrier to the (Continued)

collection point; wherein the system is arranged to physically inhibit (42) removal of the carrier by the user from the collection point.

20 Claims, 5 Drawing Sheets

(56) References Cited

U.S. PATENT DOCUMENTS

| | | | |
|---|---|---|---|
| 9,320,230 | B2 | 4/2016 | Popi |
| 10,053,287 | B2 | 8/2018 | Stefani et al. |
| 2004/0208731 | A1* | 10/2004 | Evans ................ B65G 1/04 414/268 |
| 2014/0249666 | A1 | 9/2014 | Radwallner et al. |
| 2015/0186840 | A1 | 7/2015 | Torres et al. |

FOREIGN PATENT DOCUMENTS

| | | |
|---|---|---|
| FR | 2662591 A1 | 12/1991 |
| JP | H1156573 A | 3/1999 |
| JP | 3848751 B2 * | 11/2006 |
| JP | 2011193906 A | 10/2011 |
| WO | 0216233 A1 | 2/2002 |
| WO | 2008152349 A1 | 12/2008 |
| WO | 2013147597 A1 | 10/2013 |
| WO | 2015036879 A1 | 3/2015 |

OTHER PUBLICATIONS

Office Action in Canadian Patent Application No. 2,982,053, dated Oct. 3, 2019; 5 pages.
International Search Report & Written Opinion in International Patent Application No. PCT/GB2016/051293, dated Nov. 17, 2016; 9 pages.
Combined Search and Examination Report in U.K. Patent Application No. GB1507905.6, dated Nov. 16, 2015; 6 pages.
Examination Report in U.K. Patent Application No. GB1507905.6, dated Jul. 7, 2017; 3 pages.
Combined Search and Examination Report in U.K. Patent Application No. GB1610009.1, dated Jan. 11, 2017; 5 pages.
Examination Report in U.K. Patent Application No. GB1610009.1, dated Dec. 13, 2017; 3 pages.
Non-Final Office Action in U.S. Appl. No. 15/572,100 dated Aug. 8, 2019.
Final Office Action in U.S. Appl. No. 15/572,100 dated Nov. 19, 2019.
Non-Final Office Action in U.S. Appl. No. 15/572,100 dated Mar. 9, 2020.
Final Office Action in U.S. Appl. No. 15/572,100 dated Jul. 16, 2020.
Notice of Allowance in U.S. Appl. No. 15/572,100 dated Sep. 29, 2020.

* cited by examiner

SYSTEM FOR COLLECTION OF PRODUCTS

RELATED APPLICATIONS

This invention claims priority to U.S. nonprovisional patent application Ser. No. 15/572,100, filed Nov. 6, 2017, and granted on Jan. 26, 2021 as U.S. Pat. No. 10,899,543 and entitled "A System for Collection of Products", which claims priority under 35 U.S.C. 371 to international application number PCT/GB2016/051293, which claims priority to United Kingdom Intellectual Property Office (IPO) application number 1507905.6, each of which is incorporated herein in its entirety by reference.

FIELD

The present invention relates generally to a system for collection of products, and to a method for collection of products.

BACKGROUND

Traditional shopping methods typically involve a user of one or more shops (e.g. a shopper or customer) visiting one or more physical shops, browsing around such physical shops whilst choosing items for purchase, paying for the items in each particular shop at that particular shop, and then returning home with the purchased products. In recent years, methods of shopping have changed considerably. For instance, it is now quite common for at least part of the shopping process, for example the ordering and purchase of products, to be undertaken by telephone, and even more frequently via online shopping systems. For instance, in one example a user might browse the website of an online retailer, select products for purchase, and then make that purchase, all online and without leaving their home or computer screen.

There are various methods by which the user can obtain the products that they have purchased. In one method, the products are simply despatched to the user when ready for despatch. This might be inconvenient for the user, since they might have little or no control as to when the despatched products are actually delivered at their home, for example. In a related method, the user may have a degree of control as to when the products are delivered, for example by choosing a delivery slot or similar. However, this has the convenience that the user has to be at the delivery location for a particular delivery slot. Firstly, it may be difficult to find a delivery slot in the schedule of a busy user. Secondly, the user may not have time to stay at their home, for example, during the entire duration of the delivery slot.

An alternative to the above delivery methods exists. This alternative involves the products being delivered to a location that is not, for instance, the user's home or work address. Instead, the delivery location is a collection centre or site, where the orders of multiple users may be delivered. The user can then visit this collection centre at a time that best suits them, within reason. For instance, a collection centre might be located near the user's place of work or near the user's home. This might allow the user to conveniently collect their purchased products as they leave for work, or as they return home, or similar, without needing to remain at home all day for a delivery, or to arrange and then be available for a particular delivery slot.

Such collection centres and related collection systems find various forms, often related to the type and nature of products in question. In one example, the collection centre might comprise a plurality of lockers within a shop, and the products purchased by a particular user may be delivered to a particular locker for collection by that user at a convenient time. In another example, a collection centre might comprise a manned counter, which fronts a storage facility which stores pre-boxed or pre-bagged products purchased by the user, typically grouped together by user. The user may visit the centre, and collect their products, at a prearranged time.

Whilst these approaches have their uses, they also have disadvantages. For instance, there have been attempts to at least partially automate part of the collection process, to avoid the need for the user to remember and/or select a particular locker, or to man a collection centre.

At least partial automation of collection centres typically involves the use of carriers for carrying products ordered by the user. All purchase products may fit within a single carrier, or may be spread across multiple carriers. In existing approaches, the carrier is relatively disposable in nature, or of a sufficiently low value to be considered as such, for example taking the form of thin plastic bags, or cardboard boxes, or similar. This is to the extent that the user will take away the carrier with the purchased products. However, not all carriers are disposable, or of such a low value to be treated as such. It may therefore be desirable to at least attempt to prevent removal of the carrier from the collection point, due to the intrinsic value of the carrier itself. It might also be desirable to at least attempt to prevent removal of the carrier from the collection centre for reasons other than possible theft of the carriers or simply loss of the carriers. For instance, the carriers may be in some way tracked within a collection system of a collection centre, and removal of the carriers from the collection centre may negatively interfere with such tracking. Also, removal of the carriers from the collection centre may also result in the carriers simply being left in the proximity of the collection centre, which could be deemed as unsightly, untidy, and potentially hazardous for other users.

It would therefore appear that all existing systems for collection of products have treated the carriers themselves as relatively disposable, and have not realised the advantages in identifying the removal of carriers as being potentially problematic, and/or the problems associated with carrier removal.

It is an example aim of example embodiments of the present invention to at least partially obviate or mitigate the disadvantages of the prior art, whether identified herein or elsewhere, or to at least provide an alternative to existing systems or methods.

SUMMARY

According to the present invention there is provided apparatus and methods as set forth in the appended claims. Other features of the invention will be apparent from the dependent claims, and the description which follows.

According to a first aspect of the invention, there is provided a system for collection of products, the system comprising: at least one carrier for carrying products; a collection point, at which collection point a user of the system can remove products from the carrier; and a transporter arrangement for transporting the carrier to the collection point; wherein the system is arranged to physically inhibit removal of the carrier by the user from the collection point.

One or more parts of the collection point may be shaped and/or sized to physically inhibit removal of the carrier.

The collection point may comprise a counter.

The transporter arrangement may be arranged to transport the carrier below a/the counter.

The counter may comprise an access port for use in gaining access to products in the carrier.

The access port may be shaped and/or sized to inhibit removal of the carrier through the access port.

A dimension across an opening defined by the access port may be smaller than a corresponding dimension of an opening of the carrier, via which opening products are removable from the carrier.

A shape of the opening of the access port may be substantially the same as a shape of the opening of the carrier.

The counter might comprise a plurality of access ports, each access port being usable to gain access to a carrier specific to that port (e.g. locatable under that port).

The transporter arrangement might comprise a first transporter able to receive and transport one or more carriers, and to move the one or more carriers relative to the collection point, in order to selectively present to a user one or more of the one or more carriers.

The first transporter may be arranged to slide the one or more carriers across the collection point, for example under the counter.

At least a part of the first transporter and/or counter might be shaped and/or sized to inhibit lateral movement and/or rotation of each of the one or more carriers.

The collection point might comprise one or more doors that are arranged to be selectively opened and closed in order to selectively allow or prevent user access to the carrier and/or access port.

The system might comprise a carrier storage, for storing carriers.

The transporter arrangement might comprise a second transporter arranged to: transport the carrier from and/or to a carrier storage; and/or transport the carrier to and/or from the/a first transporter associated with and/or forming part of the collection point.

The system might comprise a plurality of collection points. The transporter arrangement might comprise a plurality of first transporters, one for each collection point. Each first transporter might be able to receive and transport one or more carriers, and to move the one or more carriers relative to the respective collection point, in order to selectively present to a user of that collection point one or more of the one or more carriers. The transporter arrangement might comprise a second transporter arranged to: transport one or more carriers to and/or from a carrier storage; and/or transport the one or more carriers to and/or from the/a first transporter associated with the respective collection point.

According to a second aspect of the invention, there is provided a method for collection of products, comprising: transporting a carrier of products to a collection point; allowing a user to remove products from the carrier at the same time as physically inhibiting removal of the carrier by the user from the collection point.

According to a third aspect of the invention, there is provided a collection point for use in a system for collection of products (for example, the system described above and below), wherein the collection point is arranged to receive a carrier for carrying products, at which collection point a user can remove products from the carrier; and the collection point is arranged to physically inhibit removal of the carrier by the user from the collection point.

According to a fourth aspect of the invention, there is provided a method for collection of products from a carrier at a collection point, comprising: allowing a user to remove products from the carrier at the same time as physically inhibiting removal of the carrier by the user from the collection point.

It should be apparent to the skilled person from the reading of this disclosure that one or more features described in relation to any one aspect or embodiment of the present invention may be used in combination with or in place of one or more other features of one or more other aspects of embodiments of the present invention. This is unless such combination and/or replacement would clearly be understood by the skilled person to be mutually exclusive from the reading of this disclosure when taken as a whole.

BRIEF DESCRIPTION OF DRAWINGS

For a better understanding of the invention, and to show how embodiments of the same may be carried into effect, reference will now be made, by way of example, to the accompanying diagrammatic Figures in which.

The Figures have not been drawn to any particular scale, and are simply given as an aid to understanding the principles underlying and relating to the embodiments of the present invention.

DESCRIPTION OF EMBODIMENTS

Figure 1:
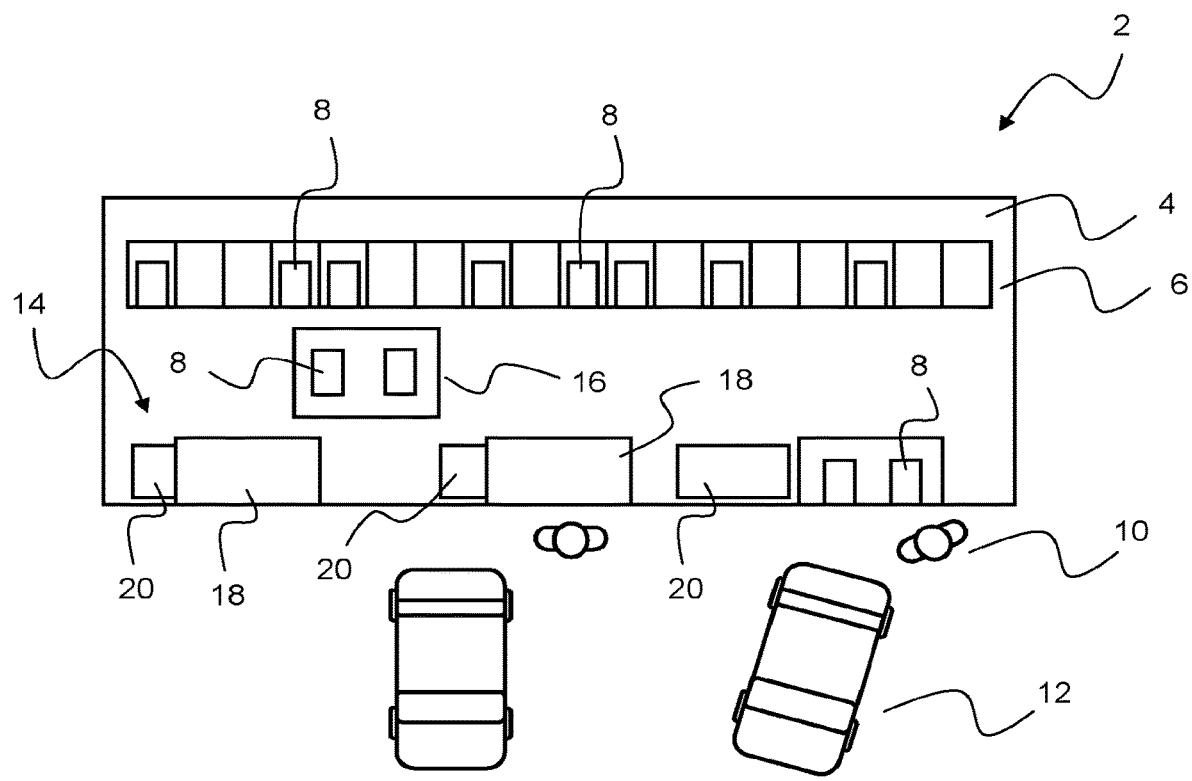
FIG. 1 schematically depicts a system for collecting products according to a first example embodiment.

FIG. 1 schematically depicts a plan view of a system 2 for collection of products, according to an example embodiment. The system 2 comprises an enclosing structure 4, for example in the form of a building or other structure. Located within the enclosing structure 4 is a carrier storage 6 for use in storing carriers 8. The system 2, with or without the enclosing structure 4, might alternatively and/or additionally be defined as a collection centre or a collection site.

The carriers 8 may carry products to be collected by a user 10, or may be empty, for example after being returned to the storage 6 after the products have been collected. Carriers 8 that carry products may be located in the storage area by a delivery driver or similar (not shown) either in a manual manner, or in at least a semi-automated manner via a carrier transporter arrangement, to be discussed in more detail below. Typically, each carrier 8 will be rigid in form, and be self-supporting in form (e.g. as opposed to a plastic bag or similar). That is, the carrier 8 is rigid enough to be handled in the automated manner described herein.

One or more parts of the storage 6 may be selectively heated or cooled to selectively heat or cool the selected carriers 8 and products carried in such carriers 8.

Typical use of the system 2 will now be described. The user 10 may, in advance of visiting the system 2, order and/or purchase products for subsequent collection. The order and/or purchase may be undertaken in an online environment or similar. Once the products have been ordered and/or purchased, the order may be processed at a remote location, for example in a picking and packing facility or distribution centre. The purchased products of a particular user will then be located in one or more particular carriers 8. Those carriers 8 will then be delivered to the system 2, as described above, for subsequent collection by the user 10.

The user may conveniently visit the system 10 at a time that is appropriate to them, for example when returning home from work or similar. The user 10 may conveniently visit the system 2 in their vehicle 12 for collection of the pre-ordered/purchased products. The user 10 will approach a collection point 14 of the system 2, at which collection point 14 the user can remove products from carriers 8.

The user 10 will identify themselves, and/or their order in some way at the collection point 14. At this point, a transporter 16 of a transporter arrangement will automatically retrieve the one or more carriers 8 specific to the user's order and then transport those carriers to the collection point 14, or a rigid counter 18 and/or further transporter 20 associated therewith or forming part thereof. The user 10 may then remove products from the carriers 8 that have been transported to the collection point 14. Removal of products may be at least partially assisted by another automated transporter 20 that is specific to that collection point. This transporter 20 may be used to selectively present to the user a number of carriers, for example the number of carriers that can be physically presented to the user at the collection point 14. That is, the transporter may receive and carry more carriers that actually be presented to the user 10 at the collection point. As described below, this might improve collection throughput, or avoid bottlenecks in the system 2.

As already discussed above, it has been identified, perhaps counter-intuitively, that it may be desirable to prevent removal of the carriers 8 from the system 2 (or a system at least similar to that shown in FIG. 1) via the collection point 14. The collection point 14 will now be discussed in more detail, in order to explain how the system is arranged to physically inhibit removal of the carrier by the user from the collection point 14. It is to be noted that this physical inhibiting is in contrast with, for instance, a general deterrent in the form of one or more warning signs, or security camera or similar.

Figure 2:
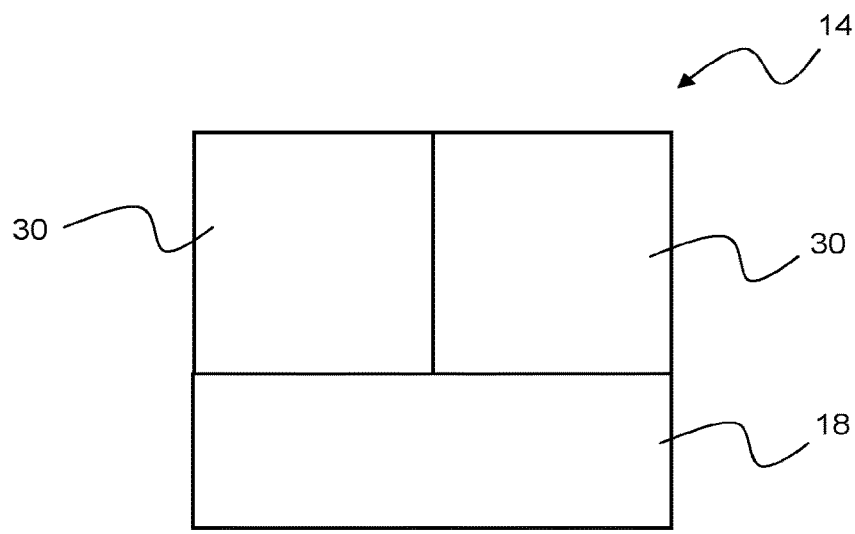
FIG. 2 schematically depicts a front-on view of a collection point of a system of FIG. 1.

FIG. 2 schematically depicts a front-on view of a collection point 14, for instance as the collection point 14 would be viewed by a user approaching a collection point 14. The collection point 14 comprises a counter 18 via which access to the products within the carriers may be achieved. However, physical access to the carriers via the counter 18 is selectively allowed or prevented by the use of one or more doors 30.

Figure 3:
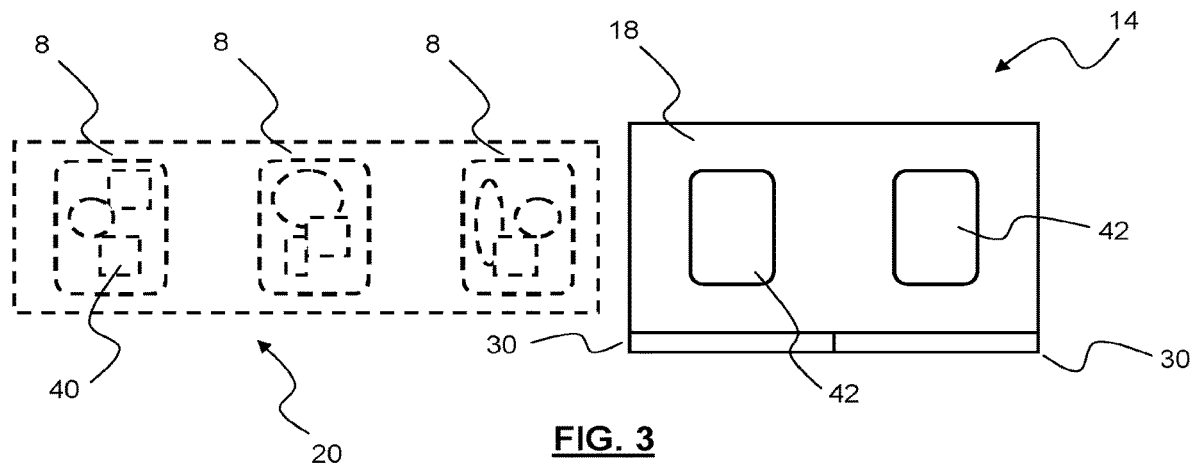
FIGS. 3 to 13 schematically depict plan and side-views of use and operation of the collection point, according to an exampled embodiment.

FIG. 3 schematically depicts a plan view of the collection point 14, and a transporter 20 associated therewith. It can be seen that the transporter 20 has already been provided with three carriers 8, each full of items 40. The transporter 20 is, in this embodiment, slidable relative to the counter 18 in order to present different carriers 8 to the user. The transporter 20 can receive and transport more carriers 8 than can be presented to the user at the counter 18. This might free up the transporter 18 of FIG. 1, for transporting carriers to and/or from other collection points 14, maximising throughput and/or limiting bottle-necks. The sliding nature may be advantageous, since it is easier to slide carriers laterally to the counter 18, than to provide a mechanism for successively bring more and more carriers to the counter from another direction (e.g. from above or below the counter, or toward or away from the counter in a direction that the user is facing).

In general, one or more parts of the collection point 14 are shaped and/or sized to physically inhibit removal of a carrier 8 from the collection point 14. The use of shaping and/or sizing is a simple but effective way of targeting where in the system the inhibiting of carrier removal takes place, and without the use of an active retention arrangement, for example a clamp or other gripping element or similar. While a clamping or other active retention arrangement might provide the required functionality, active retention might increase implementation and/or maintenance costs, and might serve as a possible failure point for the system.

FIG. 3 shows one particular aspect of the shaping/sizing of the parts of the collection point 14. In this embodiment, the counter 18 is provided with access ports 42. Each access port 42 is provided to facilitate access to products contained within carriers that are locatable underneath the counter 18 either directly (in one embodiment, not shown), or by appropriate movement of the transporter 20 as shown in the Figures. In simplistic terms, and as elaborated upon below, each access port 42 is shaped and/or sized to inhibit removal of a carrier 8 through the respective access port 42.

Figure 4:
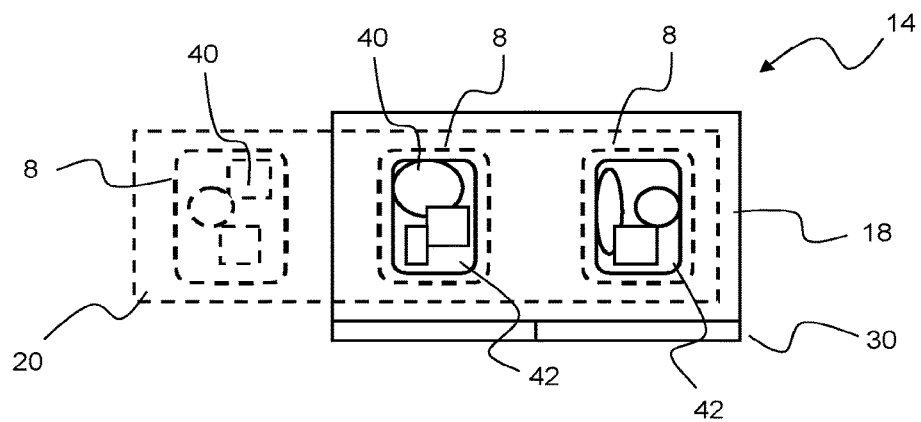

FIG. 4 shows that the transporter has moved the carriers 8 such that each of two carriers 8 are located under each of two respective access ports 42. The Figure clearly shows that an opening defined by the carrier 8, via which products are typically removed from the carrier 8, is generally larger than an opening defined by the access port 42. This might alternatively and/or additionally be defined as a dimension across an opening defined by the access port 42 being smaller than the corresponding dimension of an opening of the carrier 8, via which opening products are typically removed from the carrier 8. The corresponding dimensions may be widths, lengths, diagonals, etc. This simple but effective limitation makes it in difficult to remove the carrier 8 from the collection point 14 via the access port 42. Depending on the overall configuration of the carrier 8 and access port 42, possibly in combination with other elements of the system, the shaping/sizing makes it impossible for the carrier 8 to be removed from the collection point 14 via the access port 42 while the carrier remains intact.

Actual prevention of removal of the carrier 8 may be desirable, but is not always necessary. For instance, simply making it physically difficult to remove the carrier 8 through the access port 42 may serve as a simple physical and/or psychological deterrent to such removal.

FIG. 4 also shows that the shape of the opening defined by access port 42 is generally the same shape as the opening of the carrier 8. This may be useful for aesthetic reasons, but may also be useful for functional reasons. Functionally, the similarity in shape may give the user a guide as to the physical bounds of the carrier 8 located underneath the counter 18, or may simply allow for relatively easy removal of the products 40 from the carrier 8 due to the similarity in shape. The shape of the access port 42 and/or the shape of the opening of the carrier will typically be square or rectangular, optionally with rounded corners.

In order to inhibit the removal of the carrier 8, the difference in size between the access port opening 42 and the opening of the carrier 8 may not need to be that significant. The less significant the difference in size, the easier it will be to remove the product from the carrier 8, whilst still inhibiting removal of the carrier 8. Making the difference in size greater may make it harder to remove the carrier 8, but also harder to remove the products 40. A balance will need to be struck in each particular practical implementation of the invention.

When the carriers 8 are moved under the counter 18 and positioned underneath access ports 42, it is worth noting that the doors 30 remain closed. This may be for aesthetic reasons, so that the user does not see the system in operation, and/or may be for functional reasons, for example to prevent the user being exposed to moving parts of the system.

Figure 5:
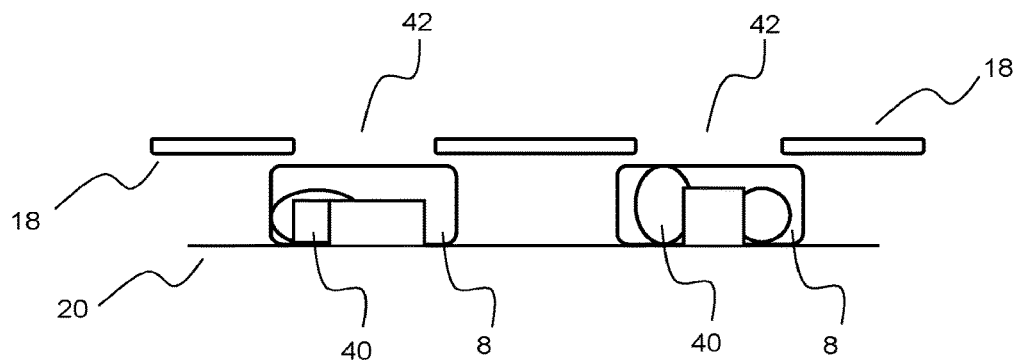

FIG. 5 shows the collection point of FIG. 4 in side-view. The relationship between the access ports 42 and the carriers 8 can be clearly seen. This side-on view also provides a guide as to additional shaping and/or size and that can be implemented to further inhibit removal of the carrier 8 through the access port 42. For instance, a distance between the transporter 20 and the counter 18 may be such that it is difficult or impossible to tilt or otherwise angle each carrier 8 away from the transporter 20, in an attempt to manipulate, or easily manipulate, the carrier 8 through the access port 42. Although not shown in the Figure, at least part of the transporter 20 may be additional shaped and/or sized to prevent lateral movement of the carriers 8 and/or rotation of the carriers 8. Such shaping and/or sizing may divide areas of the transporter 20 into carrier-specific regions. This shaping and/or sizing may again serve to inhibit removal of the carrier through the access port 42, but may also have other functionality, for example to limit/inhibit tipping or rotation of the carriers 8 to the extent that would prevent automated handling and transport of the carriers further downstream in the system. For instance, the transporter may be provided with upstanding walls/protrusions, to at least partially box in the carrier and inhibit lateral movement and/or rotation.

Because carrier 8 removal is inhibited, the problems mentioned above are obviated or mitigated.

Figure 6:
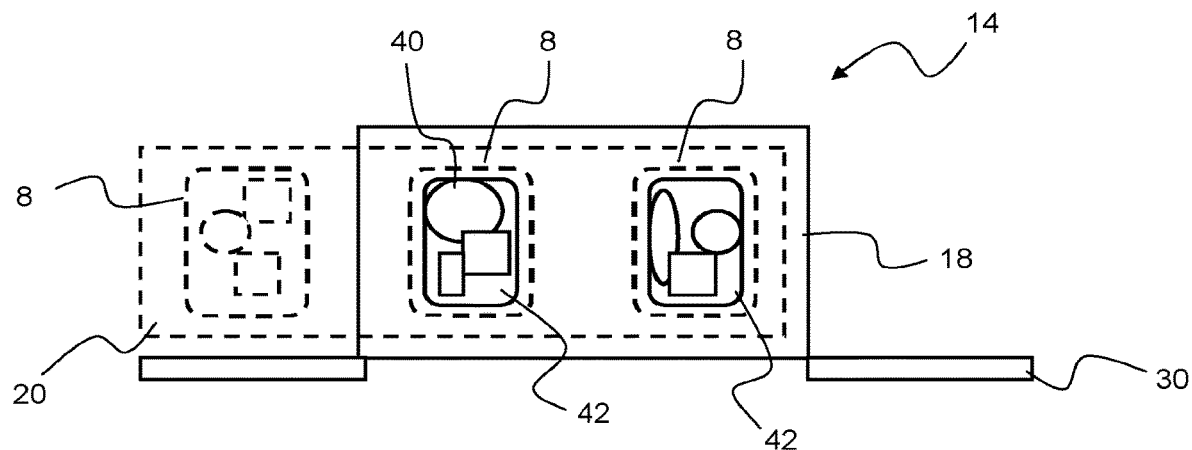

FIG. 6 shows that when the carriers 8 carrying products 40 have been moved under the counter 18 for presentation to the user, the doors 30 of the collection point 14 are opened. Opening the doors 30 allows the user to safely access the products 40 within the carriers 8, since at this stage the transporter 20 has stopped moving, and there is therefore a reduced risk of the user becoming injured by moving parts of the system.

Figure 7:
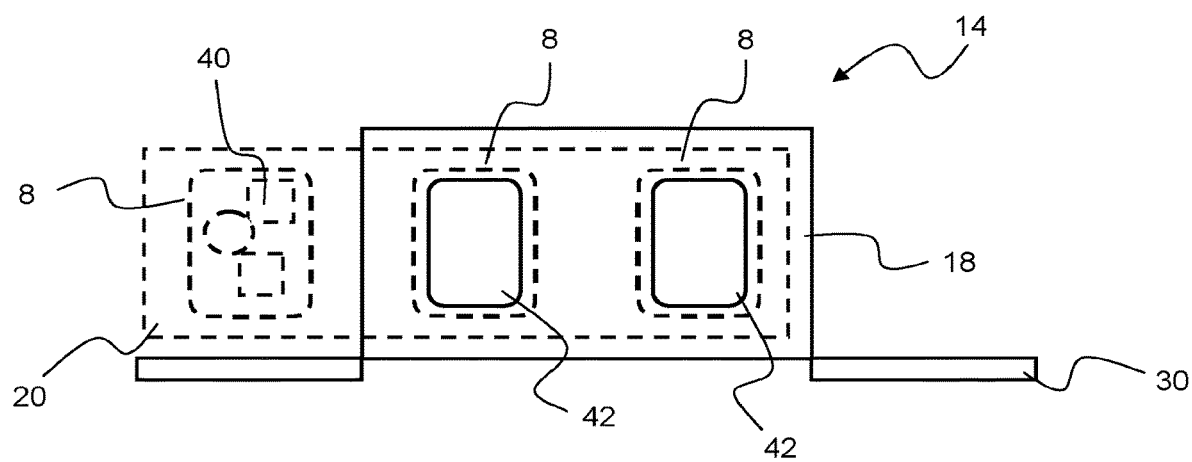

FIG. 7 shows that the items have been removed from the carriers 8 that were presented to the user via the open doors 30. Again, and as already described in more detail above, the opening of the access port 42 is slightly smaller than the opening of the carrier located underneath, meaning that while the user can easily access and remove items from the carrier 8, removal of the carrier 8 itself is inhibited.

Figure 8:
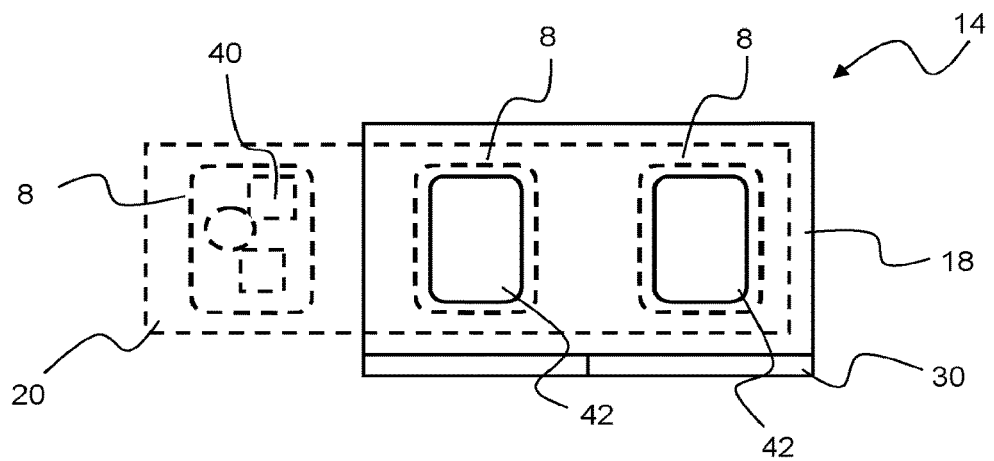

FIG. 8 shows that once the products have been removed from the carriers 8, the doors 30 of the collection point 14 are closed. The user may indicate that all products 40 have been removed from the carriers 8, or that all required products from the carriers 8 have been removed. That is, not all products 40 may actually be removed from the carriers 8, for instance, if an incorrect product has been mistakenly placed in the carrier 8, or if a product is damaged. Alternatively and/or additionally, closing of doors may be undertaken automatically, for example after a predetermined period of time, or when user movement or interaction is no longer detected in a given period of time.

Figure 9:
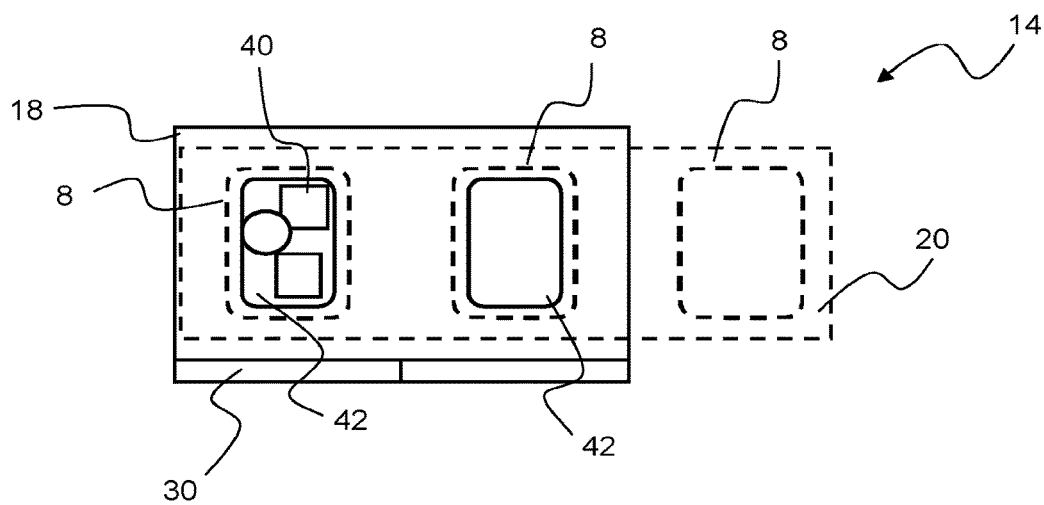

FIG. 9 shows that once the doors 30 have been closed, the transporter 20 slides laterally across the collection point 14 to bring (in this case) the remaining carrier 8 with remaining products 40 under an access port 42 of the counter 18.

Figure 10:
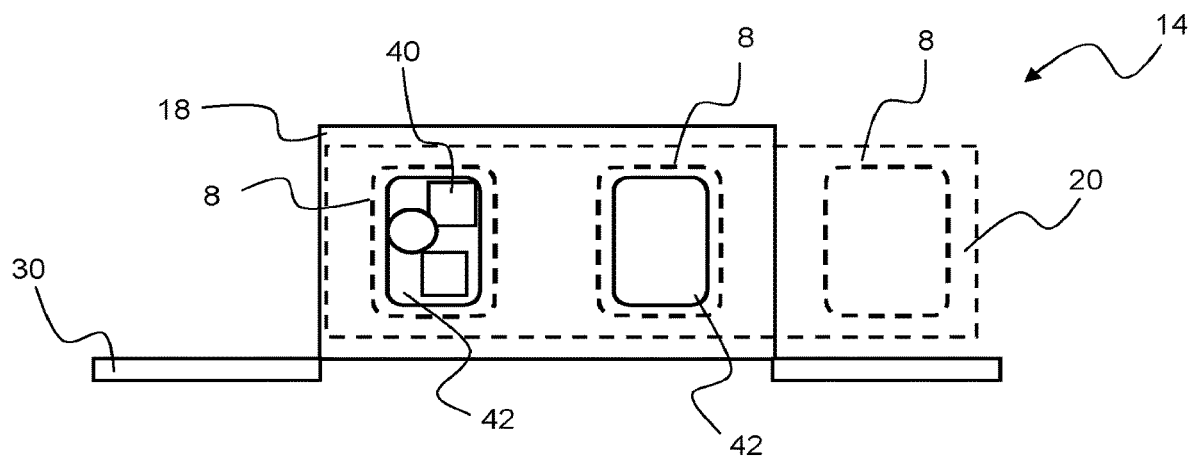

FIG. 10 shows that when the transporter has been moved as shown in FIG. 9, the doors 30 are again opened to allow for user access to the products 40 in the carrier 8.

Figure 11:
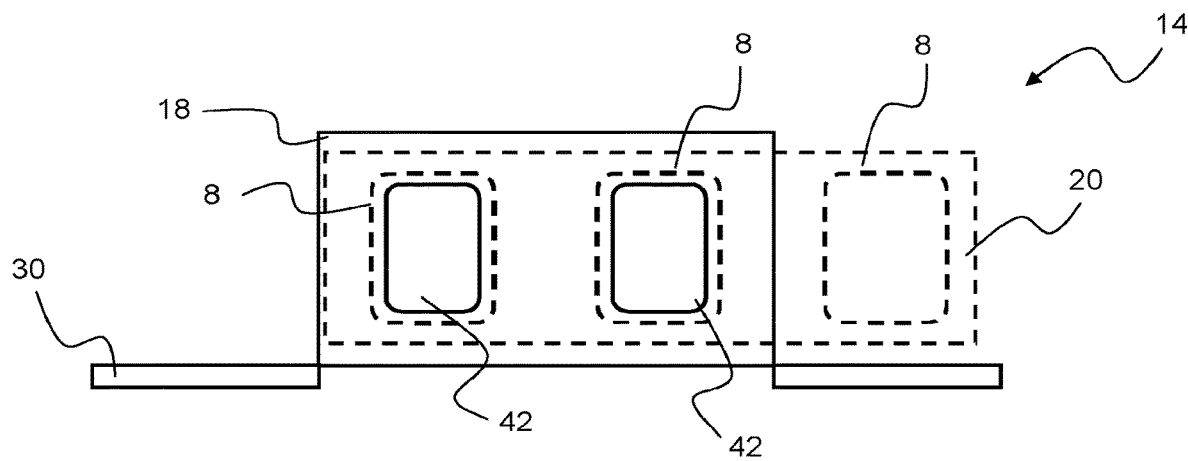

FIG. 11 shows the situation when the products 40 have been removed from the carrier 8.

Figure 12:
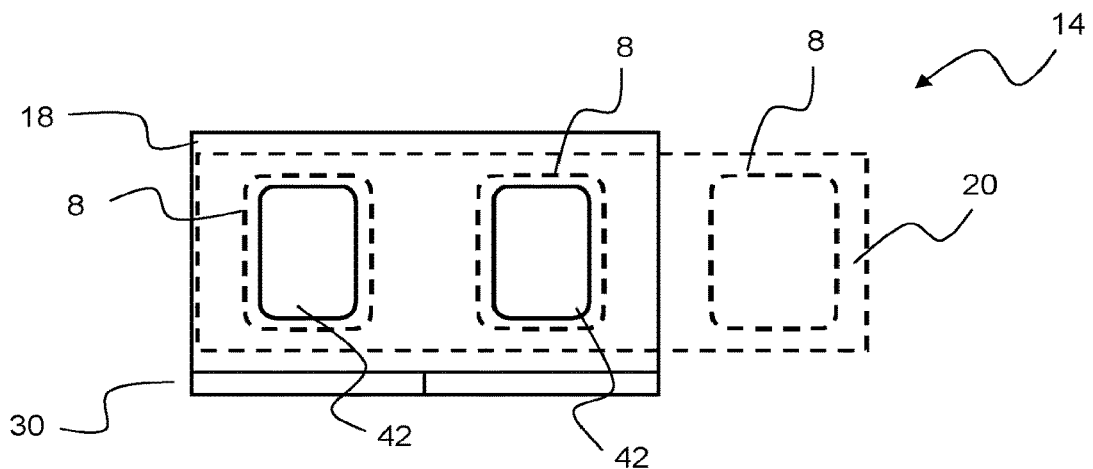

FIG. 12 shows that once the products have been removed or moved to a desired or sufficient extent, the doors 30 are, again, closed.

Figure 13:
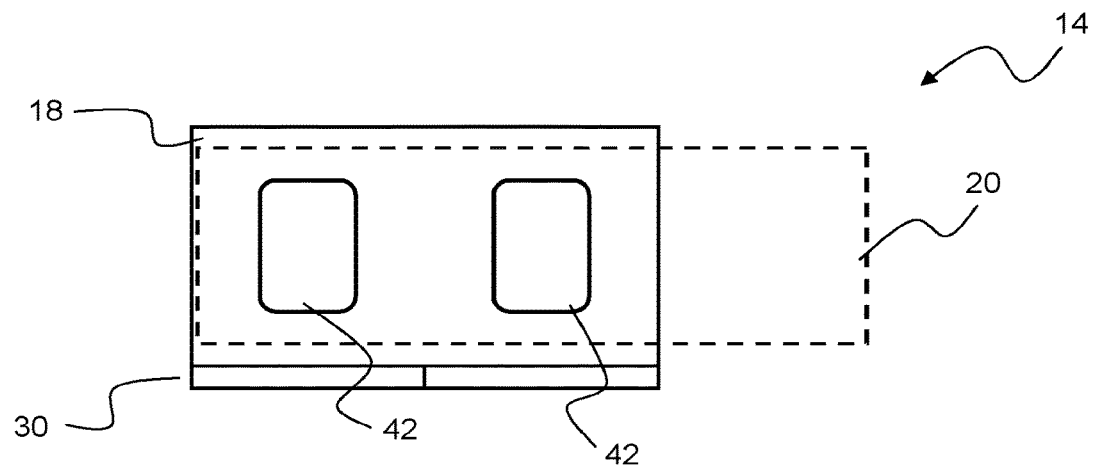

FIG. 13 shows that the carriers 8 are then removed from the transporter 20, for example via the transporter 16 shown in FIG. 1, and for instance for storage in the carrier storage 6 of FIG. 1.

The carriers may later be collected from the system, for example when a new delivery of product-filled carriers is made, or at a separate time. Empty carriers (and/or carriers with unwanted or uncollected products) may be returned to the pick and packing centre, for subsequent use.

Figure 14:
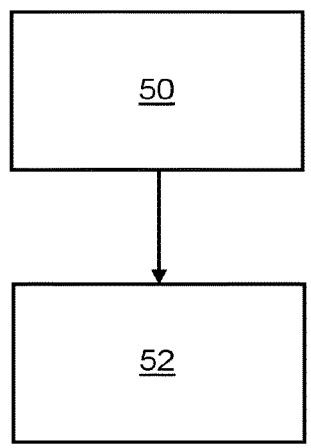
FIGS. 14 and 15 schematically depict collection methods in accordance with example embodiments.
Figure 15:
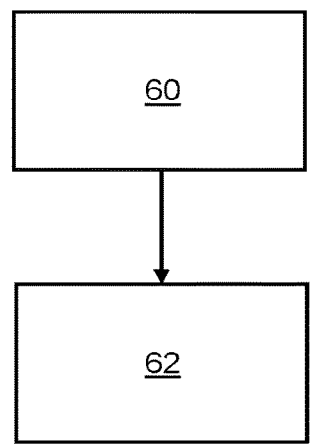

It will be understood that the embodiments described in relations to FIGS. 1-13 also depict a collection method. The collection method is shown in general form in FIG. 14. The collection method comprises transporting a carrier of products to a collection point (50); allowing a user to remove products from the carrier at the same time as physically inhibiting removal of the carrier by the user from the collection point (52). At least the transporting will typically be automated. FIG. 15 depicts a closely related method. There is provided a method for collection of products from a carrier at a collection point. The method comprises: allowing a user to remove products from the carrier (60) at the same time as physically inhibiting removal of the carrier by the user from the collection point (62). The methods may be applied to existing collection systems.

FIGS. 2-15 have described a single collection point, its use, and its operation. However, and as shown in FIG. 1, multiple collection points may be used in any single collection system. This might allow collection to be undertaken by multiple users in a simultaneous, parallel manner.

The use of a single transporter to transport carriers from a carrier storage to one or more collection points may be sufficient for throughput purposes, especially when each collection point is provided with its own transporter for receiving more carriers than can be presented to the user at any one time. This collection point transporter can then be used to present specific carriers to the user, without the need to use the transporter that has transported the carriers from the carrier storage. This might increase throughput, or at least avoid any bottlenecks in the system. Of course, different configurations may be needed in different systems, for example multiple transporters to transport carriers from a carrier storage to one or more collection points, especially if the number of collection points is large.

To the extent described above, it will be appreciated that almost all of the collection system and related method may be automated, with the exception of the actual collection of items by the user. This allows for a very efficient system as a whole.

In the above embodiments, a collection point has been described, together with a transporter used in connection with that collection point. The collection point might be described as including this transporter in one embodiment, or in another embodiment the first transporter might be described as forming part of the collection point at certain times, at least when moved underneath the counter to present the carriers to the user. In another embodiment, the collection point and the associated transporter might be described as separate entities.

In the earlier embodiments, the carriers have been described as being moved underneath a counter. The term "counter" is functional, and might alternatively and/or additionally be described and/or functionally defined as a plate, a surface, a shroud, a desk or anything under which the carriers can be moved and via which the carriers can subsequently be accessed.

As described above, and to avoid any doubt, to inhibit carrier removal does not necessarily mean to prevent carrier removal. The inhibiting might be, or serve as a hindrance, a deterrent or an attempt at retention.

The term "carrier" has been used throughout the above embodiments. Again, "carrier" is functional in nature, and could refer to one of a number of different structures, or the same structure having different names, for example in different countries. For instance, a carrier might be alternatively and/or additionally described as, and/or functionally defined as, a tote, a crate, a box, a basket, and the like. Typically, the carrier will be rigid in form, and be self-supporting in form (e.g. as opposed to a plastic bag or similar). That is, the carrier is rigid enough to be handled in the automated manner described above, whilst carrying and retaining products, but without being so readily deformable as to be extractable through (e.g.) the access ports without damaging the carrier. The carrier might typically take the form of an open crate-like or basket-like structure, which might be formed at least partially from a polymeric material.

Typically, all carriers used in the system will have substantially the same external shape, size and, likely, surface detailing. This consistency will assist in the automated handling and general processing of the carriers as described above in an automated manner. To that extent, even pre-packaged products, which might be packaged in shipping and/or postal packaging, might still be transported around the system in such carriers, since it is likely to be much easier to handle uniform carriers as previously described, than different shaped individually packaged products in isolation.

The term "collection point" has been used throughout the above embodiments. Collection point might be alternatively and/or additionally defined as a collection region, area, port, desk—i.e. a location at which collection of products takes place.

In the automated system described above, the system might comprise one or more collection points. In another embodiment, a collection point as described above might be used in conjunction with, for example installed at, an existing system.

The above described system and method might find particular use in grocery shopping or the like, which is a growing area in which users purchase products online, for subsequent collection. However, the invention is, of course, not limited to the field of groceries. The invention could be applied to any scenario in which products are purchased or ordered in advance, for subsequent collection, since all of the above advantages will still apply to such scenarios.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A system for collection of products, comprising:

a first carrier and a second carrier, each of the first carrier and the second carrier configured to carry products;

a collection point configured to enable products to be removed from the first carrier and the second carrier, the collection point comprising a horizontal counter including a first access port and a second access port in the counter for gaining access to the products, and a transporter arrangement constructed and arranged parallel to and under the counter to automatically laterally slide each of the first carrier and the second carrier along and under an entirety of the counter to selectively present the products in the first carrier or the second carrier through the first access port or the second access port, wherein each of the first access port and the second access port is constructed and arranged to inhibit removal of the first carrier or the second carrier through the respective access port.

2. The system of claim 1, wherein each of the first access port and the second access port includes a same shape as a shape of the first carrier and the second carrier and a smaller size than a size of the first carrier and the second carrier to provide access to the products and inhibit the removal of the first carrier or the second carrier through the first access port or the second access port.

3. The system of claim 1, further comprising one or more doors in front of the counter that are arranged to be selectively opened and closed in order to selectively allow user access to at least one of the first carrier, the second carrier, the first access port, or the second access port and to prevent access to the first access port and the second access port when the one or more doors are closed.

4. The system of claim 3, wherein the one or more doors are opened automatically by the system in response to a movement of the first carrier or the second carrier carrying the products under the counter to the first access port and the second access port, and wherein the one or more doors are automatically closed by the system in response to a removal of the products from the first carrier or the second carrier via the first access port or the second access port.

5. The system of claim 4, wherein the transporter arrangement slides laterally relative to the collection point when the one or more doors are automatically closed.

6. The system of claim 5, wherein:
   each of the first access port and the second access port is constructed and arranged to expose the second carrier under the counter at the respective access port after the first carrier has been exposed under the counter at the first access port, and
   the one or more doors are automatically opened by the system to expose a product in the second carrier through the first access port in response to a movement of the second carrier under the counter.

7. The system of claim 1, wherein a dimension across an opening defined by each of the first access port and the second access port is smaller than a corresponding dimension of an opening of the first carrier and the second carrier via which the products are removable from the first carrier or the second carrier.

8. The system of claim 7, wherein a shape of the opening of each of the first access port and the second access port is substantially the same as a shape of the opening of the first carrier and the second carrier.

9. The system of claim 1, wherein:
   the transporter arrangement comprises a first transporter able to receive and transport the first carrier and the second carrier from a location external to the counter and the collection point, and
   the first transporter is configured to, upon receipt of the first carrier and the second carrier at the collection point from the external location, slide the first carrier and the second carrier laterally across the collection point and under the counter in order to selectively present the first carrier via the first access port.

10. The system of claim 9, wherein at least a part of one or more of the first transporter and counter is shaped and sized to inhibit one or more of lateral movement and rotation of each of the first carrier and the second carrier.

11. The system of claim 9, wherein the transporter arrangement comprises a second transporter arranged to:
   transport the first carrier and the second carrier to and from a carrier storage; and
   transport the first carrier and the second carrier to and from the first transporter associated with the collection point.

12. The system of claim 1, wherein:
   each of the first access port and the second access port is usable to gain access to at least one carrier of the first carrier and the second carrier.

13. The system of claim 1, further comprising a plurality of collection points, wherein:
   the transporter arrangement comprises:
      a plurality of first transporters, one for each collection point, each first transporter configurable to receive and transport the first carrier and the second carrier and to move the first carrier and the second carrier in order to selectively present one or more of the first carrier and the second carrier at a respective collection point; and
      a second transporter arranged to:
         transport the first carrier and the second carrier to and from a carrier storage; and
         transport the first carrier and the second carrier to and from a first transporter of the plurality of first transporters associated with the respective collection point.

14. The system of claim 1, wherein the transporter arrangement is constructed and arranged to move from a location external to a first side of the counter, under the first access port and second access port extending through the counter, and further through a second side of the counter to another location external to the second side of the counter.

15. A system for collection of products, comprising:
   a first carrier and a second carrier, each of the first carrier and the second carrier configured to carry products;
   a collection point configured to enable products to be removed from the first carrier and the second carrier, the collection point comprising a horizontal counter including a first access port and a second access port in the counter for gaining access to the products; and
   a transporter arrangement constructed and arranged parallel to and under the counter to automatically laterally slide each of the first carrier and the second carrier along and under the collection point to selectively present the products in the first carrier or the second carrier through the first access port or the second access port, wherein:
      each of the first access port and the second access port includes a same shape of the first carrier and the second carrier and a smaller size than a size of the first carrier and the second carrier to provide access to the products and physically prevent removal of the first carrier or the second carrier through the respective access port.

16. The system of claim 15, further comprising one or more doors in front of the counter that are arranged to be selectively opened and closed in order to selectively allow user access to at least one of i) the first carrier and the second carrier or ii) the first access port or the second access port, and to prevent access to the first access port and the second access port when the one or more doors are closed.

17. The system of claim 16, wherein:
   the one or more doors are opened automatically by the system in response to a movement of the first carrier and the second carrier carrying the products under the counter to the first access port and the second access port, and
   the one or more doors are automatically closed by the system in response to a removal of the products via the first access port or the second access port.

18. The system of claim 15, wherein:
   each of the first access port and the second access port is usable to gain access to at least one carrier of the first carrier and the second carrier.

19. The system of claim 15, wherein the transporter arrangement is further configured to:
   receive and transport the first carrier and the second carrier from a location external to the counter and the collection point to the collection point, and
   upon receipt of the transported first carrier and the second carrier at the collection point from the external location, slide the transported first carrier and the second carrier laterally across the collection point and under the counter in order to selectively present to a user the transported first carrier and the second carrier via the first access port or the second access port.

20. A method for collection of products, comprising:
   transporting a first carrier of products and a second carrier of products to a collection point for removal from the first carrier and the second carrier, the collection point including a horizontal counter including a first access port and a second access port;
   laterally transporting the first carrier and the second carrier along and under the counter;
   selectively presenting the products through the first access port or the second access port while physically inhibiting removal of the first carrier or the second carrier through the respective access port, wherein each of the first access port and the second access port includes a same shape as a shape of the first carrier and the second carrier and a smaller size than a size of the first carrier the second carrier to present the first carrier or the second carrier through the first access port or the second access port;

automatically gaining access to products through the first access port or the second access port.

* * * * *